(12) United States Patent
Xu

(10) Patent No.: US 10,458,331 B2
(45) Date of Patent: Oct. 29, 2019

(54) FUEL INJECTOR WITH HEAT PIPE COOLING

(71) Applicant: United Technologies Corporation, Farmington, CT (US)

(72) Inventor: JinQuan Xu, East Greenwich, RI (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 478 days.

(21) Appl. No.: 15/187,149

(22) Filed: Jun. 20, 2016

(65) Prior Publication Data
US 2017/0363004 A1 Dec. 21, 2017

(51) Int. Cl.
| F02C 7/22 | (2006.01) |
| F23R 3/28 | (2006.01) |
| F01D 25/12 | (2006.01) |
| F02C 7/14 | (2006.01) |
| F02C 7/12 | (2006.01) |

(Continued)

(52) U.S. Cl.
CPC ............... *F02C 7/12* (2013.01); *F02C 7/222* (2013.01); *F02C 7/224* (2013.01); *F23D 11/36* (2013.01); *F23R 3/283* (2013.01); *F23R 3/30* (2013.01); *F23R 3/346* (2013.01); *F23R 3/42* (2013.01); *F28D 15/02* (2013.01); *F28D 15/04* (2013.01); *F02C 7/14* (2013.01); *F05D 2220/32* (2013.01);

(Continued)

(58) Field of Classification Search
CPC .... F02C 7/12; F02C 7/22; F02C 7/224; F02C 7/222; F23R 3/30; F23R 3/42; F23R 3/346; F23R 3/283; F23R 3/28; F05D 2220/32; F05D 2240/35; F05D 2260/208; F28D 15/02; F28D 15/04; F23D 11/36
See application file for complete search history.

(56) References Cited

U.S. PATENT DOCUMENTS 2,541,108 A * 2/1951 Sforzini ................. F02C 7/222
60/739
3,661,202 A * 5/1972 Moore, Jr. ............. F28D 15/06
126/350.2

(Continued)

FOREIGN PATENT DOCUMENTS

| EP | 2846090 A2 | 3/2015 | |
| GB | 2476253 * | 6/2011 | ............. F23D 14/78 |

(Continued)

OTHER PUBLICATIONS

European Search Report, European Application No. 171769854, dated Oct. 26, 2017, European Patent Office; European Search Report 7 pages.

(Continued)

*Primary Examiner* — Todd E Manahan
*Assistant Examiner* — Todd N Jordan
(74) *Attorney, Agent, or Firm* — Cantor Colburn LLP

(57) ABSTRACT

Fuel injectors for gas turbine engines are provided herein. The fuel injectors include a nozzle configured to dispense fuel into a combustor of a gas turbine engine, a fuel conduit fluidly connecting a fuel source to the nozzle, and a heat pipe having a vaporization section and a condensation section, wherein the vaporization section is in thermal communication with the nozzle and the condensation section is in thermal communication with a cooling source of the gas turbine engine.

18 Claims, 5 Drawing Sheets

(51) Int. Cl.
*F23R 3/30* (2006.01)
*F23R 3/42* (2006.01)
*F02C 7/224* (2006.01)
*F23R 3/34* (2006.01)
*F23D 11/36* (2006.01)
*F28D 15/04* (2006.01)
*F28D 15/02* (2006.01)

(52) U.S. Cl.
CPC .... *F05D 2240/35* (2013.01); *F05D 2260/208* (2013.01); *F23D 2214/00* (2013.01)

(56) References Cited

U.S. PATENT DOCUMENTS

| | | | | |
|---|---|---|---|---|
| 3,720,058 A * | 3/1973 | Collinson et al. | ........ | F23R 3/28 261/79.1 |
| 3,882,335 A * | 5/1975 | Fries | ........ | H02K 9/20 310/61 |
| 3,910,035 A * | 10/1975 | Juhasz | ........ | F23R 3/26 60/39.23 |
| 3,999,400 A * | 12/1976 | Gray | ........ | F01D 5/088 62/115 |
| 4,052,144 A * | 10/1977 | Marek | ........ | F23R 3/30 165/47 |
| 4,165,472 A * | 8/1979 | Wittry | ........ | H01J 35/106 313/30 |
| 4,389,002 A * | 6/1983 | Devellian | ........ | B29C 45/20 165/104.26 |
| 4,499,735 A * | 2/1985 | Moore | ........ | F02C 7/228 60/739 |
| 4,525,175 A * | 6/1985 | Stellaccio | ........ | C10J 3/506 239/132.3 |
| 4,547,145 A * | 10/1985 | Jahnke | ........ | C10J 3/485 252/373 |
| 4,666,397 A * | 5/1987 | Wenning | ........ | C01B 3/363 239/132.3 |
| 4,736,693 A * | 4/1988 | Clomburg, Jr. | ........ | C10J 3/506 110/263 |
| 4,858,538 A * | 8/1989 | Kuypers | ........ | C10J 3/506 110/264 |
| 4,887,962 A * | 12/1989 | Hasenack | ........ | F23D 14/78 110/263 |
| 4,991,398 A * | 2/1991 | Clark | ........ | F23R 3/14 60/748 |
| 5,119,886 A * | 6/1992 | Fletcher | ........ | F28D 15/0208 165/104.25 |
| 5,283,488 A * | 2/1994 | Ponnappan | ........ | H02K 9/20 310/54 |
| 5,331,814 A * | 7/1994 | Sandelis | ........ | F23R 3/34 60/733 |
| 5,865,030 A * | 2/1999 | Matsuhama | ........ | F02C 7/224 60/267 |
| 5,894,887 A * | 4/1999 | Kelsey | ........ | C23C 16/4401 118/724 |
| 6,276,611 B1 * | 8/2001 | Brooker | ........ | C10J 3/485 239/5 |
| 6,334,297 B1 * | 1/2002 | Dailey | ........ | F23R 3/04 60/751 |
| 8,360,342 B2 * | 1/2013 | Mishra | ........ | F02C 3/28 239/132.3 |
| 9,746,184 B2 * | 8/2017 | Papple | ........ | F23R 3/10 |
| 9,822,969 B2 * | 11/2017 | Dinu | ........ | F23D 1/005 |
| 9,863,638 B2 * | 1/2018 | Donovan | ........ | F23R 3/286 |
| 9,909,448 B2 * | 3/2018 | Gerstler | ........ | F01D 9/041 |
| 2006/0218926 A1 * | 10/2006 | Prociw | ........ | F02C 7/14 60/739 |
| 2009/0166004 A1 * | 7/2009 | Lai | ........ | F28D 15/046 165/104.26 |
| 2009/0277176 A1 * | 11/2009 | Caples | ........ | F02C 7/222 60/737 |
| 2010/0236759 A1 * | 9/2010 | Wadley | ........ | E04C 2/34 165/104.19 |
| 2010/0263388 A1 * | 10/2010 | Norris | ........ | F01D 9/065 60/806 |
| 2012/0180992 A1 * | 7/2012 | Koplow | ........ | F04D 25/0606 165/104.21 |
| 2013/0260321 A1 * | 10/2013 | Colannino | ........ | F23Q 3/00 431/2 |
| 2014/0146116 A1 * | 5/2014 | Paschkewitz | ........ | B41J 2/14233 347/88 |
| 2014/0165570 A1 * | 6/2014 | Herring | ........ | F02C 7/14 60/730 |
| 2015/0285501 A1 * | 10/2015 | DiCintio | ........ | F23R 3/14 60/740 |
| 2015/0323186 A1 | 11/2015 | Xu | | |
| 2016/0216042 A1 * | 7/2016 | Bozorgi | ........ | F28D 15/0233 |
| 2017/0218845 A1 * | 8/2017 | Snyder | ........ | F02C 7/185 |
| 2017/0336073 A1 * | 11/2017 | Weir | ........ | F23J 15/06 |
| 2018/0195906 A1 * | 7/2018 | Wang | ........ | G01J 5/042 |

FOREIGN PATENT DOCUMENTS

| | | |
|---|---|---|
| GB | 2476253 A | 6/2011 |
| WO | 2004063628 A2 | 7/2004 |

OTHER PUBLICATIONS

Faghri, Amir; "Review and Advances in Heat Pipe Science and Technology"; Journal of Heat Transfer, 2012, vol. 134, 18 pages.

\* cited by examiner

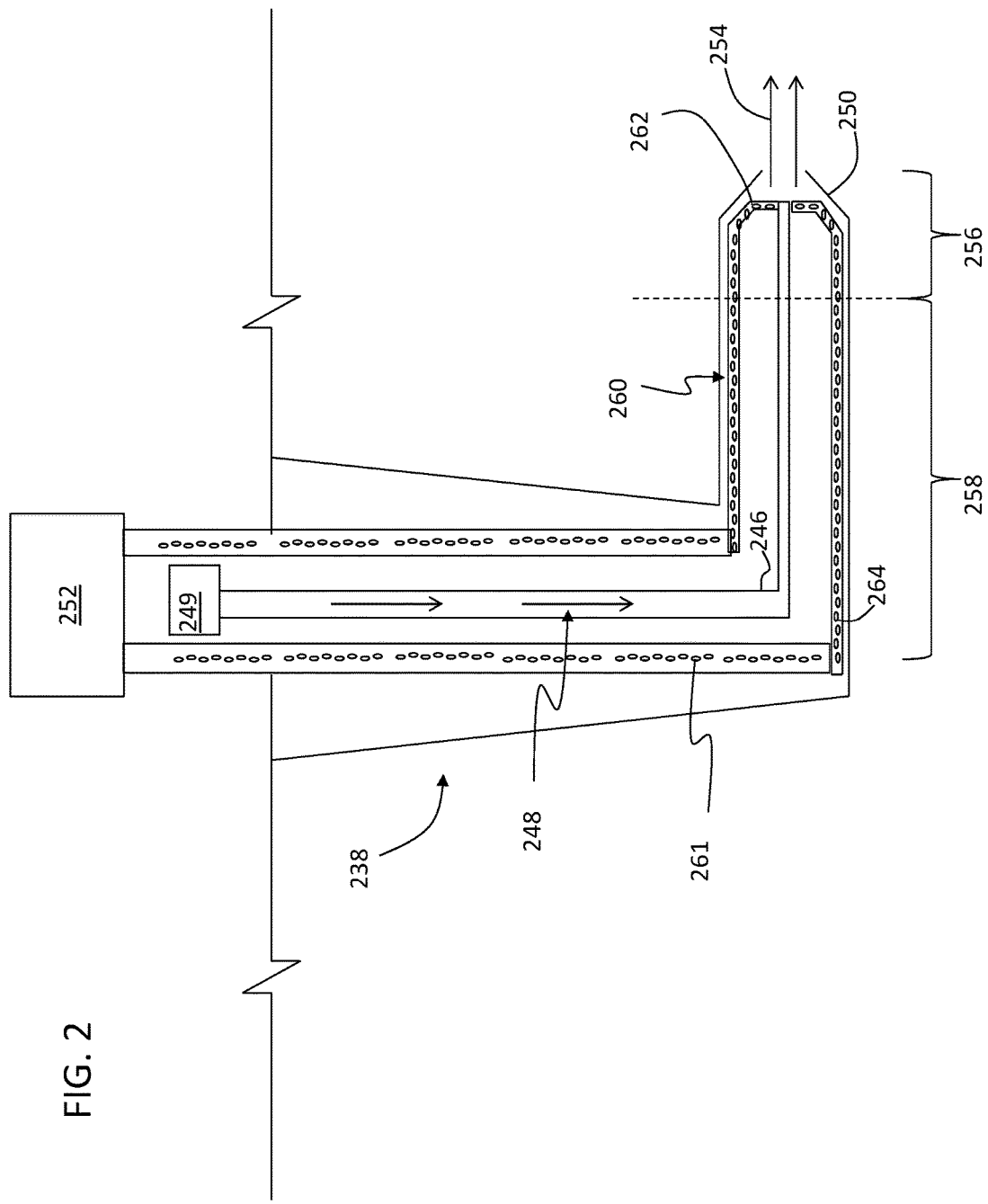

FUEL INJECTOR WITH HEAT PIPE COOLING

BACKGROUND

The subject matter disclosed herein generally relates to components for combustors in gas turbine engines and, more particularly, to improved cooling for components of combustors of gas turbine engines.

Gas turbine engines, such as those that power modern commercial and military aircraft, include a compressor section to pressurize a supply of air, a combustor section to burn a hydrocarbon fuel in the presence of the pressurized air, and a turbine section to extract energy from the resultant combustion gases and generate thrust. The combustor section generally includes a plurality of circumferentially distributed fuel injectors that project toward a combustion chamber to supply fuel to be mixed and burned with the pressurized air. Gas turbine engines typically include a plurality of centralized staging valves in combination with one or more fuel supply manifolds that deliver fuel to the fuel injectors.

Each fuel injector typically has an inlet fitting connected to the manifold at the base, a conduit connected to the base fitting, and a nozzle connected to the conduit to spray the fuel into the combustion chamber. Appropriate valves or flow dividers are provided to direct and control the flow of fuel through the nozzle.

A combustor may include pilot and main fuel injectors. Generally, the main fuel injectors are for normal and high power situations, while the pilot fuel injectors are used for start operation or for emission control. The main or pilot fuel injectors have relatively small openings in the nozzles and small fuel passages in the conduits that may be prone to coke formation due to high fuel temperature. Coke formation may result in narrowed fuel openings in the nozzles, uneven fuel burn and increased maintenance requirements. Further, coke formation may form in the fuel conduit of the fuel injector, break off in fragments and ultimately obstruct fuel injector nozzle tip openings.

Conventional fuel injector designs typically utilize heat shields around the fuel injector conduit to provide a passive insulated, static, air gap and reduce the heat transfer rate within a diffuser case module to the fuel.

SUMMARY

According to one embodiment, a fuel injector for a gas turbine engine is provided. The fuel injector includes a nozzle configured to dispense fuel into a combustor of a gas turbine engine, a fuel conduit fluidly connecting a fuel source to the nozzle, and a heat pipe having a vaporization section and a condensation section, wherein the vaporization section is in thermal communication with the nozzle and the condensation section is in thermal communication with a cooling source of the gas turbine engine.

In addition to one or more of the features described above, or as an alternative, further embodiments of the fuel injector may include that the cooling source is at least one of the fuel of the fuel injector or compressed air.

In addition to one or more of the features described above, or as an alternative, further embodiments of the fuel injector may include that the vaporization section of the heat pipe is wrapped around the nozzle.

In addition to one or more of the features described above, or as an alternative, further embodiments of the fuel injector may include that at least a portion of the heat pipe passes through a wall of a portion of the fuel injector.

In addition to one or more of the features described above, or as an alternative, further embodiments of the fuel injector may include that the heat pipe is integrally formed with at least one of the nozzle and the fuel conduit.

In addition to one or more of the features described above, or as an alternative, further embodiments of the fuel injector may include that the heat pipe is one of a thermosiphon, a capillary-driven heat pipe, an annular heat pipe, a vapor chamber, a gas-loaded heat pipe, a loop heat pipe, a capillary pumped loop heat pipe, a pulsating heat pipe, a micro heat pipe, or a miniature heat pipe.

In addition to one or more of the features described above, or as an alternative, further embodiments of the fuel injector may include that the nozzle and fuel conduit are components of an axially staged fuel injector.

In addition to one or more of the features described above, or as an alternative, further embodiments of the fuel injector may include that the nozzle and fuel conduit are components of a radially staged fuel injector.

In addition to one or more of the features described above, or as an alternative, further embodiments of the fuel injector may include that at least a portion of the fuel injector is additively manufactured and the heat pipe is formed by the additive manufacturing process within the fuel injector.

In addition to one or more of the features described above, or as an alternative, further embodiments of the fuel injector may include that the heat pipe is a pulsating heat pipe.

According to another embodiment, a gas turbine engine is provided. The gas turbine engine includes a combustor section having a plurality of components and a heat pipe configured with at least one of the plurality of components of the combustor section, the heat pipe having a vaporization section and a condensation section, wherein the vaporization section of the heat pipe is in thermal communication with the at least one component and the condensation section is in thermal communication with a cooling source.

In addition to one or more of the features described above, or as an alternative, further embodiments of the gas turbine engine may include that the at least one component is a first fuel injector having a nozzle and a fuel conduit fluidly connecting a fuel source to the nozzle, wherein the vaporization section is in thermal communication with the nozzle and the condensation section is in thermal communication with the cooling source.

In addition to one or more of the features described above, or as an alternative, further embodiments of the gas turbine engine may include that the vaporization section of the heat pipe is wrapped around the nozzle.

In addition to one or more of the features described above, or as an alternative, further embodiments of the gas turbine engine may include that the nozzle and fuel conduit are components of an axially staged fuel injector.

In addition to one or more of the features described above, or as an alternative, further embodiments of the gas turbine engine may include that the first fuel injector is an axially staged fuel injector of the gas turbine engine.

In addition to one or more of the features described above, or as an alternative, further embodiments of the gas turbine engine may include a second fuel injector that is a radially staged fuel injector of the gas turbine engine.

In addition to one or more of the features described above, or as an alternative, further embodiments of the gas turbine engine may include that the second fuel injector includes a second nozzle configured to dispense fuel into the combustor and a second fuel conduit fluidly connecting a second fluid source to the second nozzle, the gas turbine engine further comprising a second heat pipe having a vaporization section and a condensation section, wherein the vaporization section of the second heat pipe is in thermal communication with the nozzle of the second fuel injector and the condensation section of the second heat pipe is in thermal communication with a second cooling source.

In addition to one or more of the features described above, or as an alternative, further embodiments of the gas turbine engine may include that at least one of the first and second fluid sources are the same fluid source or the first and second cooling sources are the same cooling source.

In addition to one or more of the features described above, or as an alternative, further embodiments of the gas turbine engine may include that the heat pipe is integrally formed with the at least one component of the combustor.

In addition to one or more of the features described above, or as an alternative, further embodiments of the gas turbine engine may include that the heat pipe is one of a thermosiphon, a capillary-driven heat pipe, an annular heat pipe, a vapor chamber, a gas-loaded heat pipe, a loop heat pipe, a capillary pumped loop heat pipe, a pulsating heat pipe, a micro heat pipe, or a miniature heat pipe.

In addition to one or more of the features described above, or as an alternative, further embodiments of the gas turbine engine may include that the component of the combustor is additively manufactured and the heat pipe is formed by the additive manufacturing process within the component.

Technical effects of embodiments of the present disclosure include fuel injectors and other components of gas turbine engines having improved cooling. Further technical effects include fuel injectors having heat pipes configured therewith to provide improved cooling to a component of a gas turbine engine (e.g., a nozzle of a fuel injector).

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

FIG. 2 is a schematic illustration of a fuel injector incorporating a heat pipe in accordance with an embodiment of the present disclosure;

DETAILED DESCRIPTION

Figure 1A:
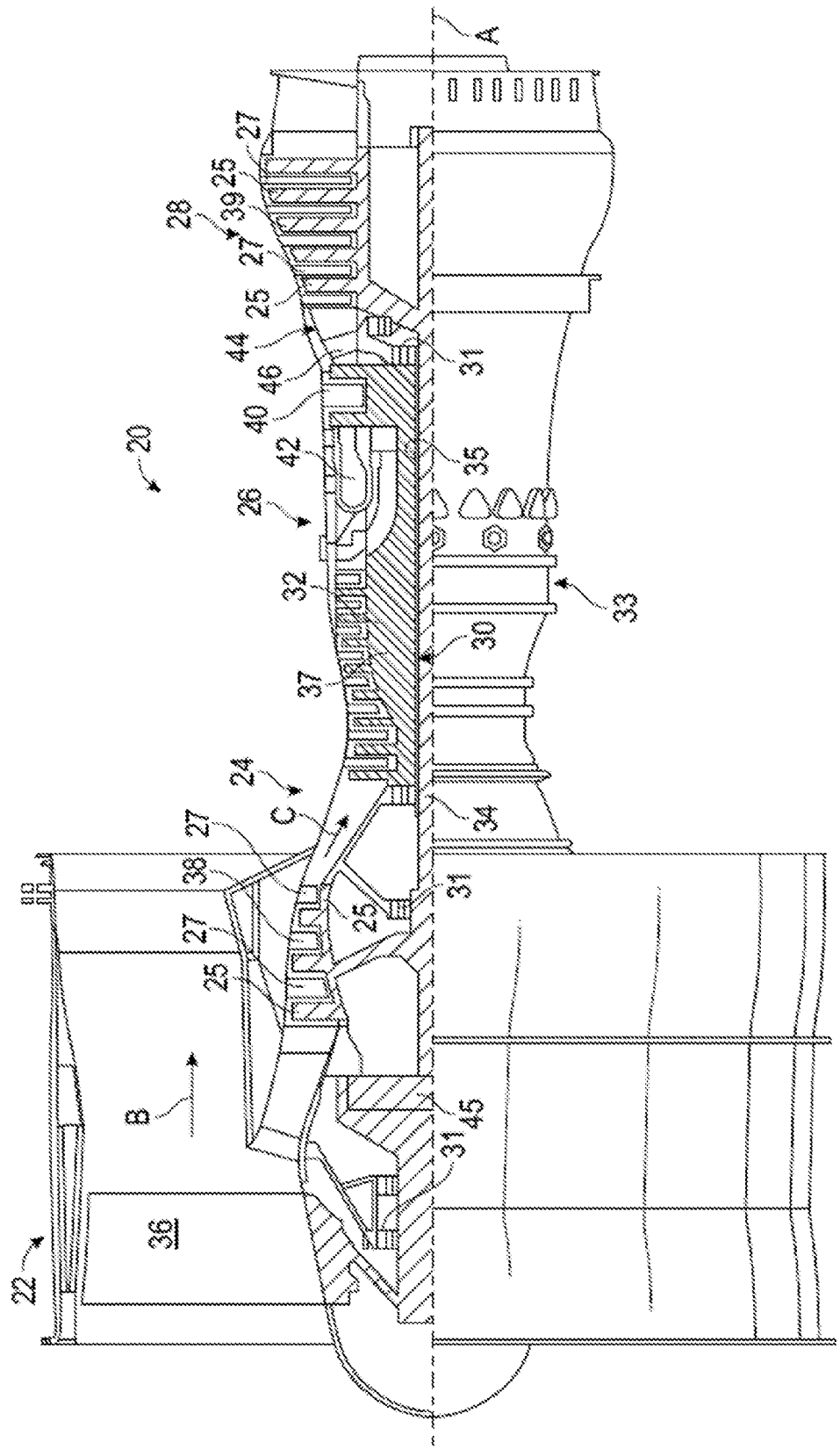
FIG. 1A is a schematic cross-sectional illustration of a gas turbine engine that may employ various embodiments disclosed herein.

As shown and described herein, various features of the disclosure will be presented. Various embodiments may have the same or similar features and thus the same or similar features may be labeled with the same reference numeral, but preceded by a different first number indicating the figure to which the feature is shown. Thus, for example, element "a" that is shown in FIG. X may be labeled "Xa" and a similar feature in FIG. Z may be labeled "Za." Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

FIG. 1A schematically illustrates a gas turbine engine 20. The exemplary gas turbine engine 20 is a two-spool turbofan engine that generally incorporates a fan section 22, a compressor section 24, a combustor section 26, and a turbine section 28. Alternative engines might include an augmenter section (not shown) among other systems for features. The fan section 22 drives air along a bypass flow path B, while the compressor section 24 drives air along a core flow path C for compression and communication into the combustor section 26. Hot combustion gases generated in the combustor section 26 are expanded through the turbine section 28. Although depicted as a turbofan gas turbine engine in the disclosed non-limiting embodiment, it should be understood that the concepts described herein are not limited to turbofan engines and these teachings could extend to other types of engines, including but not limited to, three-spool engine architectures.

The gas turbine engine 20 generally includes a low speed spool 30 and a high speed spool 32 mounted for rotation about an engine centerline longitudinal axis A. The low speed spool 30 and the high speed spool 32 may be mounted relative to an engine static structure 33 via several bearing systems 31. It should be understood that other bearing systems 31 may alternatively or additionally be provided.

The low speed spool 30 generally includes an inner shaft 34 that interconnects a fan 36, a low pressure compressor 38 and a low pressure turbine 39. The inner shaft 34 can be connected to the fan 36 through a geared architecture 45 to drive the fan 36 at a lower speed than the low speed spool 30. The high speed spool 32 includes an outer shaft 35 that interconnects a high pressure compressor 37 and a high pressure turbine 40. In this embodiment, the inner shaft 34 and the outer shaft 35 are supported at various axial locations by bearing systems 31 positioned within the engine static structure 33.

A combustor 42 is arranged between the high pressure compressor 37 and the high pressure turbine 40. A mid-turbine frame 44 may be arranged generally between the high pressure turbine 40 and the low pressure turbine 39. The mid-turbine frame 44 can support one or more bearing systems 31 of the turbine section 28. The mid-turbine frame 44 may include one or more airfoils 46 that extend within the core flow path C.

The inner shaft 34 and the outer shaft 35 are concentric and rotate via the bearing systems 31 about the engine centerline longitudinal axis A, which is co-linear with their longitudinal axes. The core airflow is compressed by the low pressure compressor 38 and the high pressure compressor 37, is mixed with fuel and burned in the combustor 42, and is then expanded over the high pressure turbine 40 and the low pressure turbine 39. The high pressure turbine 40 and the low pressure turbine 39 rotationally drive the respective high speed spool 32 and the low speed spool 30 in response to the expansion.

The pressure ratio of the low pressure turbine 39 can be pressure measured prior to the inlet of the low pressure turbine 39 as related to the pressure at the outlet of the low pressure turbine 39 and prior to an exhaust nozzle of the gas turbine engine 20. In one non-limiting embodiment, the bypass ratio of the gas turbine engine 20 is greater than about ten (10:1), the fan diameter is significantly larger than that of the low pressure compressor 38, and the low pressure turbine 39 has a pressure ratio that is greater than about five (5:1). It should be understood, however, that the above parameters are only examples of one embodiment of a geared architecture engine and that the present disclosure is applicable to other gas turbine engines, including direct drive turbofans.

In this embodiment of the example gas turbine engine 20, a significant amount of thrust is provided by the bypass flow path B due to the high bypass ratio. The fan section 22 of the gas turbine engine 20 is designed for a particular flight condition—typically cruise at about 0.8 Mach and about 35,000 feet (10,668 meter). This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example gas turbine engine 20 is less than 1.45. Low Corrected Fan Tip Speed is the actual fan tip speed divided by an industry standard temperature correction of $[(T_{ram}° R)/(518.7° R)]^{0.5}$, where $T_{ram}$ represents the ambient temperature in degrees Rankine. The Low Corrected Fan Tip Speed according to one non-limiting embodiment of the example gas turbine engine 20 is less than about 1150 feet per second (fps) (351 meters per second (m/s)).

Each of the compressor section 24 and the turbine section 28 may include alternating rows of rotor assemblies and vane assemblies (shown schematically) that carry airfoils that extend into the core flow path C. For example, the rotor assemblies can carry a plurality of rotating blades 25, while each vane assembly can carry a plurality of vanes 27 that extend into the core flow path C. The blades 25 of the rotor assemblies create or extract energy (in the form of pressure) from the core airflow that is communicated through the gas turbine engine 20 along the core flow path C. The vanes 27 of the vane assemblies direct the core airflow to the blades 25 to either add or extract energy.

Figure 1B:
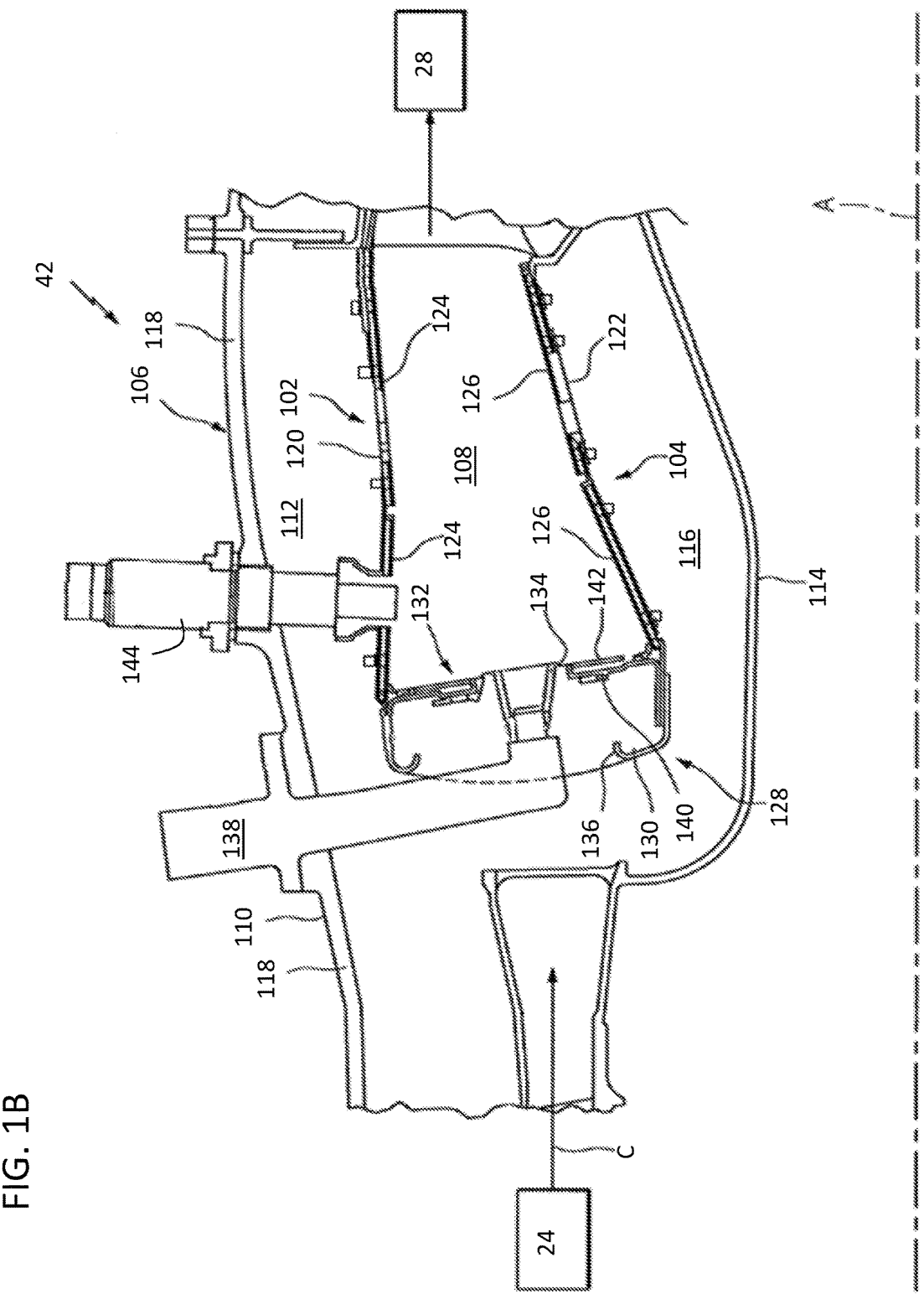
FIG. 1B is a schematic illustration of a combustor section of a gas turbine engine that may employ various embodiments disclosed herein.

With reference to FIG. 1B, an enlarged schematic illustration of the combustor 42 is shown. The combustor 42 can be annular and generally includes an outer wall 102, an inner wall 104 and a diffuser case module 106. The outer wall 102 and the inner wall 104 are spaced apart radially with respect to axis A and such that a combustion chamber 108 is generally defined there between. The combustion chamber 108 is generally annular in shape. The outer wall 102 is spaced radially inward from a diffuser outer case 110 of the diffuser case module 106, with an annular outer plenum 112 being defined there between. The inner wall 104 is spaced radially outward from a diffuser inner case 116 of the diffuser case module 106 to define an annular inner plenum 116. It should be understood that although a particular combustor is illustrated, other combustor types with various combustor wall and case arrangements will also benefit here from. For instance, the diffuser outer case 110 maybe an integral part of an engine case structure 118.

Furthermore, although shown and described with respect to an aircraft engine, those of skill in the art will appreciate that embodiments provided herein can be employed within land-based or sea-based gas turbine engines and/or so industrial gas turbines (IGT). Furthermore, combustors as provided herein can be annular combustors, can combustors, or other types of combustors as known in the art. Further, in some embodiments, such as in industrial gas turbines, as known, water may be injected into the combustion chamber and used for emission control. Such water and/or associated water supply can be used as a cooling source for the heat pipes as described herein.

Each combustor wall 102, 104 generally includes a respective support shell 120, 122, respectively, that supports one or more liners 124, 126, respectively, mounted to a hot side of the respective support shell 120, 122. The liners 124, 126 directly define the combustion chamber 108 that contains the flow of combustion products for driving the turbine section 28. The liners 124, 126 can be comprised of a plurality of Impingement Film Float (IFF) panels orientated in a generally rectilinear liner array. Each panel can be manufactured of, for example, a nickel based super alloy, ceramic, or other temperature resistant material. In non-limiting embodiments, the array of panels of the liners can include a plurality of forward liner panels and a plurality of aft liner panels that line the hot side of the outer shell 120 and a plurality of forward liner panels and a plurality of aft liner panels that line the hot side of the inner shell 122.

The combustor 42 also includes a forward assembly 128 immediately downstream of the compressor section 24 to guide compressed airflow C therefrom. The forward assembly 128 generally includes an annular hood 130, a bulkhead assembly 132, and a plurality of swirlers 134 (one shown) spaced circumferentially about engine axis A.

The annular hood 130 extends radially between, and in the non-limiting embodiment of FIG. 1B, is secured to, the forward most ends of the walls 102, 104. A plurality of circumferentially distributed hood ports 136 accommodate a respective plurality of first fuel injectors 138 as well as direct compressed air C into the forward end of the combustion chamber 108 through the associated swirler 134. Each first fuel injector 138, such as a primary fuel injector, can be secured to the diffuser case module 106 to project through one of the hood ports 136 and the respective swirler 134. It should be appreciated that various architectures of the forward assembly 128 can also benefit here from.

Each swirler 134, as shown in FIG. 1B, is circumferentially aligned with a respective hood port 136 to project through the bulkhead assembly 132. The bulkhead assembly 132 includes a bulkhead support shell 140 secured to the walls 102, 104, and a plurality of circumferentially distributed bulkhead heat shields 142 secured to the bulkhead support shell 140 around each swirler 134.

The forward assembly 128 and walls 102, 104 are configured to introduce core combustion air C into the forward end of the combustion chamber 108 while the remainder enters from the annular outer plenum 112 and the annular inner plenum 116. The plurality of first fuel injectors (or main fuel injector) 138 and respective swirlers 134 facilitate the generation of a blended fuel-air mixture that supports combustion in the combustion chamber 108.

Additionally, the combustor 42 can be configured with one or more second fuel injectors 144 (e.g., axially staged, pilot fuel injectors). The second fuel injectors 144 can be configured or structured similar to the first fuel injectors 138 (e.g., including swirlers, shells, supports, etc.). A difference between the second fuel injectors 144 and the first fuel injectors 138 may be the direction of injection of fuel into the combustion chamber 108. The first fuel injectors 138 inject fuel in a first direction (e.g., substantially axially along the axis A) whereas the second fuel injectors 144 inject fuel in a second direction substantially parallel to or different from the first direction. In some embodiments, the second fuel injectors can be oriented with an angle with respect to the first fuel injector(s).

As noted previously, various fuel injection systems in gas turbine engines can be subject to coking in the fuel injectors (e.g., first and second fuel injectors 138, 144), and particularly in the fuel nozzles. Coking occurs when a given fuel is heated above its critical coking temperature. Further, within staged fuel injectors, inactive or non-flowing fuel resting in nozzles or fuel conduits are vulnerable to coking. Active cooling to the nozzles and fuel conduits of the staged fuel injectors is one method to address this challenge. One example of active cooling, as presented herein, includes a heat pipe configured within, in proximity of, or wrapped around the fuel nozzle and/or fuel conduit. For example, the heat pipe, an enclosed device configured to transport heat from a vaporization section to a condensation section through cyclical evaporation and condensation of a working medium sealed in the device, can dramatically enhance cooling effectiveness within fuel nozzles or fuel conduits. That is, in accordance with various embodiments of the present disclosure, heat pipe enhanced fuel nozzle and fuel conduit cooling is provided.

For example, turning to FIG. 2, a component of a combustion section, e.g., a fuel injector, having an embedded heat pipe cooling configuration is schematically shown. As shown, a fuel injector 238 includes a fuel conduit 246 that is configured to direct fuel 248 from a fuel source 249 to a fuel nozzle 250 that injects the fuel into a combustion chamber, as described above. The fuel 248 can be relatively cold when sourced from the fuel source 249 but fuel 248 can become hot while flowing through the fuel conduit 246 toward the fuel nozzle 250 as the fuel injector 238 is immersed in hot compressed core air. In addition, the fuel nozzle 250, particularly the fuel nozzle of a pilot fuel injector, is exposed to the high temperatures within the combustion chamber and the fuel 248 can be heated while still within a portion of the fuel injector 238. As such, close to the fuel nozzle 250 fuel 248 can be heated above the critical coking temperature of the fuel 248. Accordingly, the fuel injector 238 can include a relatively hot section 256 and a relatively cool section 258.

In order to prevent or to mitigate the high temperatures, and thus minimize or eliminate coking at the nozzle 250, a heat pipe 260 can be provided in, on, or around at least a portion of the fuel injector 238. For example, as shown in FIG. 2, the heat pipe 260 is embedded within the fuel injector 238 and extends from the cool section 258 into the hot section 256 and to a cooling source 252. The heat pipe 260 can thus facilitate cooling of the hot section 256 of the fuel injector 238 to minimize or prevent coking at the nozzle 250. The heat pipe 260 can be an annular or cylindrically-shaped heat pipe structure, as shown in cross-section in FIG. 2, or in other embodiments, a number of pulsating heat pipes (also referred to as loop-type heat pipes) or sheet-shaped miniature heat pipes can be configured extending from the hot section 256 to the cold section 258 to the cooling source 252, or other heat pipe configurations such as a thermosiphon heat pipe, a capillary-driven heat pipe, a vapor chamber heat pipe, a gas-loaded heat pipe, a capillary pumped loop heat pipe, a micro heat pipe, or a miniature heat pipe are possible as known in the art.

The heat pipe 260 includes a vaporization section 262 and a condensation section 264. The vaporization section 262 is in thermal communication with the hot section 256 of the fuel injector 238 (e.g., fuel conduit 246 and nozzle 250) and the condensation section 264 of the heat pipe 260 is in thermal communication with a cooling source 252 (e.g., a cooling air source, bleed cooling air, a fuel source, a cool section of the fuel conduit, water, etc.). That is, in some embodiments, the cooling source 252 and the fuel source 249 can be a single unit (or the same unit/source) or the cooling source 252 can be fuel 248 within the fuel conduit 246 that is relatively cool. In other embodiments, the cooling source 252 can be separate from the fuel source 249 (e.g., a bleed cooling air source or air supplied for fuel mixing or combustion). Accordingly, in accordance with some embodiments, the condensation section 264 is at least partially (thermally) exposed within the fuel injector 238 and in thermal contact with a running, relatively cool fuel upstream of the hot section 256. The vaporization section 262 is in thermal contact with fuel and/or gases that are at or near the hot section 256 such as the nozzle 250. Such a configuration can take advantage of a relatively cool temperature of the fuel 248 and transfer thermal energy into the fuel 248 from the condensation section 264 while a working medium 261 in the heat pipe 260 condenses (evaporate comes from the vaporization section 262). The condensed working medium 261 can then flow to the vaporization section 262 to receive thermal energy (heat) at the hot section 256 such as the nozzle 250. The condensed working medium 261 will then vaporize and flow back to the condensation section 264.

Although described above with respect to a heat pipe configured within a fuel injector of a combustor section of a gas turbine engine, those of skill in the art will appreciate that heat pipes can be installed into, on, or otherwise configured with various other components of a combustor section of a gas turbine engine to facilitate cooling. For example, in some embodiments of the present disclosure, heat pipes can be configured within combustor liners, bulk head structures of the combustor, heat shields, swirlers, hoods, support shells, etc. Accordingly, the present disclosure is not intended to be limited to heat pipes within fuel injectors, but rather such configurations are provided for illustrative and explanatory purposes.

Figure 3A:
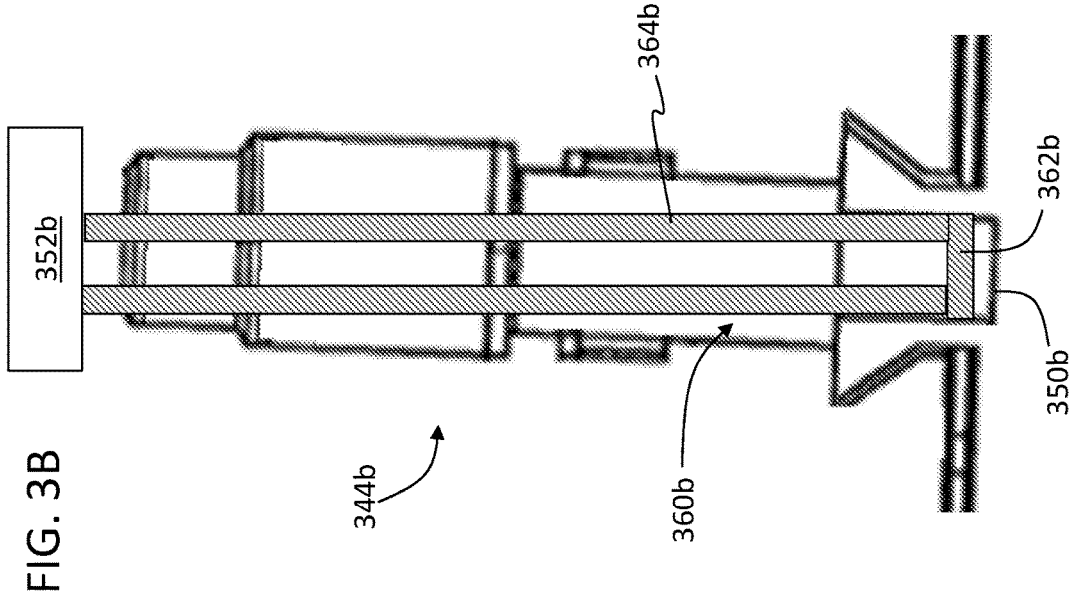
FIG. 3A is a schematic illustration of an alternative configuration of a heat pipe installed with a fuel injector in accordance with an embodiment of the present disclosure.

Turning now to FIG. 3A, an alternative configuration of a cooled fuel injector in accordance with an embodiment of the present disclosure is shown. In FIG. 3A, a fuel injector 344a is shown and is configured as an axially staged fuel injector (e.g., as described above). The fuel injector 344a includes a similar configuration to that shown and described above and thus certain features will not be shown or described in detail for simplicity. The primary difference between the configuration of FIG. 2 and the configuration of FIG. 3A is that a heat pipe 360a, having working medium 361a, in FIG. 3A is wrapped around an exterior of the fuel injector 344a (as compared to being embedded within the fuel injector/fuel conduit) for retrofitting.

As shown, the heat pipe 360a includes a vaporization section 362a that is wrapped around or embedded within a nozzle 350a of the fuel injector 344a. Further, as shown, a condensation section 364a of the heat pipe 360a is configured to extend along the fuel injector 344a (e.g., to a cooling source 352a). In some embodiments, the condensation section 364a can be configured to pass through an aperture in the side of the fuel injector 344a such that the condensation section 364a extends into an interior fuel conduit of the fuel injector 344a. In some embodiments, the condensation section 364a can be extended into a cooling source 352a (e.g., fuel source of the fuel injector). In such embodiments, the condensation section 364a can enable direct thermal contact between the heat pipe 360a and a cool fuel within the fuel injector 344a. In other embodiments, such as that shown in FIG. 3A, the condensation section 364a may extend along an exterior surface of the fuel injector 344a to the cooling source 352a. In another embodiment, the heat pipe is a pulsating heat pipe.

Figure 3B:
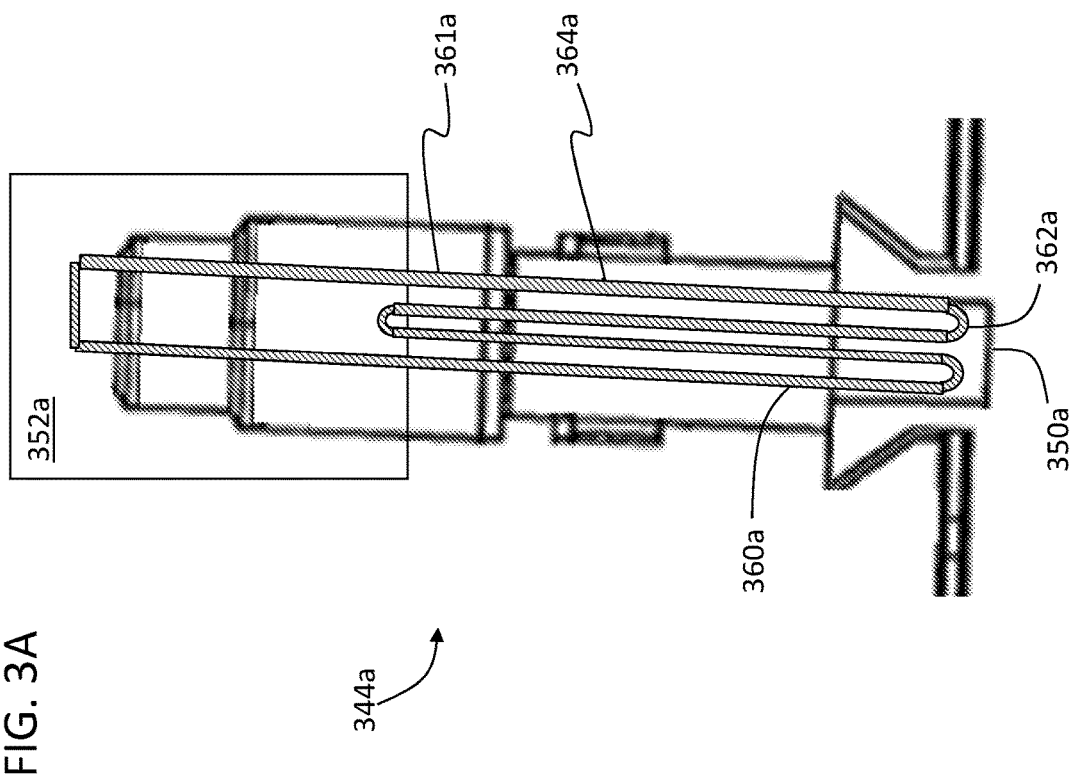
FIG. 3B is a schematic illustration of an alternative configuration of a heat pipe installed with a fuel injector in accordance with an embodiment of the present disclosure.

Turning now to FIG. 3B, an alternative configuration of a heat pipe installed with a fuel injector in accordance with the present disclosure is shown. In the embodiment of FIG. 3B, the fuel injector 344b is similar to that shown in FIG. 3A. However, the heat pipe 360b has a different, alternative structure. As shown, the heat pipe 360b has an annular structure that is wrapped around or embedded within the nozzle 350b of the fuel injector 344b. In alternative configurations, the structure of the heat pipe can be embedded into or additively manufactured with the nozzle and/or the fuel injector. As shown, the heat pipe 360b includes a vaporization section 362b that is in thermal contact and configured around a nozzle 350b as a ring or annular structure and a condensation section 364b of the heat pipe 360b is configured to extend along the fuel injector 344b (or into the fuel injector 344b as described above) to a cooling source 352b. Further, in some embodiments, the structure can extend from the nozzle 350b toward or into a fuel conduit (e.g., a cooling source) of the fuel injector 344b (or a separate cooling source 352b). That is, in some embodiments, the annular structure can form a cylinder that extends from the nozzle toward the fuel conduit of the fuel injector.

Figure 4:
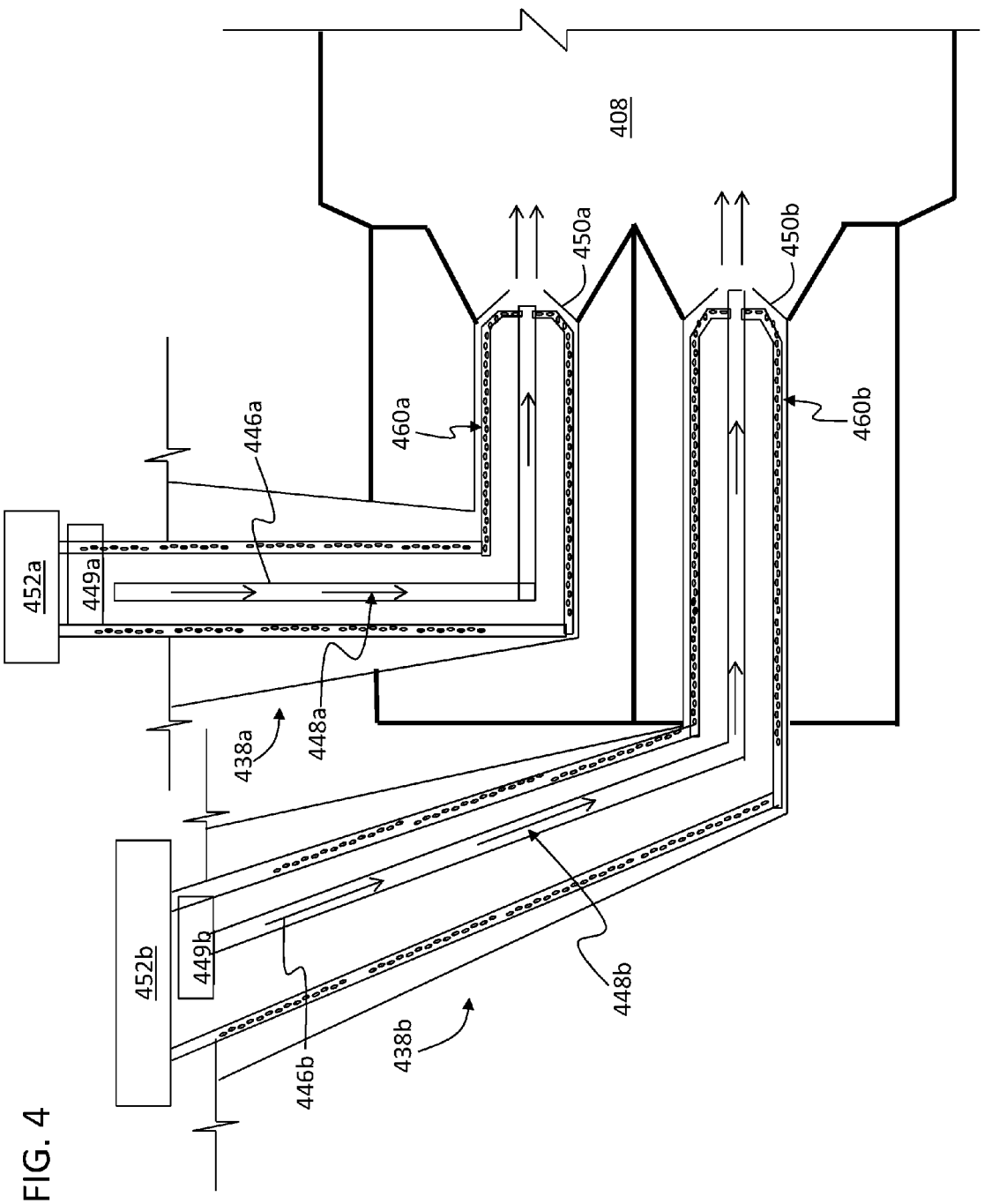
FIG. 4 is a schematic illustration of an alternative configuration of heat pipes installed within fuel injectors of a radially staged combustor in accordance with an embodiment of the present disclosure.

Turning now to FIG. 4, a two fuel injector system (e.g., a radially staged combustor) having embedded heat pipe cooling configurations is schematically shown. As shown, a first fuel injector 438a includes a first fuel conduit 446a that is configured to direct a first fuel 448a from a first fuel source 449a to a first fuel nozzle 450a that injects the fuel into a combustion chamber 408, as described above. As shown, a second fuel injector 438b includes a second fuel conduit 446b that is configured to direct a second fuel 448b from a second fuel source 449b to a second fuel nozzle 450b that injects the fuel into the combustion chamber 408 at a radially different location than the first fuel nozzle 450a. In some embodiments, as will be appreciated by those of skill in the art, the first and second fuel sources 449a, 449b can be the same fuel source with fuel that is supplied along the first and second fuel conduits 446a, 446b.

Similar to the embodiments described above, in order to prevent or to mitigate high temperatures and thus minimize or eliminate coking at the nozzles 450a, 450b, first and second heat pipes 460a, 460b can be provided in, on, or around a portion of respective fuel injectors 438a, 438b. For example, as shown in FIG. 4, a first heat pipe 460a is embedded within or wrapped around the first fuel conduit 446a and extends to the first nozzle 450a. Similarly, a second heat pipe 460b is embedded within or wrapped around the second fuel conduit 446b and extends to the second nozzle 450b. The first and second heat pipes 460a, 460b can thus facilitate cooling to respective fuel injectors 438a, 438b to minimize or prevent coking at the nozzles 450a, 450b thereof. The heat pipes 460a, 460b can be an annular or cylindrical heat pipe structures, pulsating heat pipes, sheet-shaped heat pipes, or can be configured in other shapes, sizes, geometries, etc. as known in the art. The heat pipes 460a, 460b can function as describe above and be thermally in communication with respective cooling sources 452a, 452b (which in some embodiments is the same cooling source; and in some embodiments may be the fuel sources 449a, 449b).

As used herein, the heat pipes in accordance with various embodiments may include, but are not limited to, two-phase closed thermosiphons, capillary-driven heat pipes, annular heat pipes, vapor chambers, gas-loaded heat pipes, loop heat pipes, capillary pumped loop heat pipes, pulsating heat pipes, micro or miniature heat pipes, inverted meniscus heat pipes, or other types of heat pipes or thermal transfer devices as known in the art. Further, working media may include, but is not limited to, helium, nitrogen, ammonia, acetone, methanol, fluorocarbon liquids, ethanol, water, toluene, mercury, sodium, lithium, silver, combinations thereof, etc. Those of skill in the art will appreciate that the material used to form the heat pipe may be selected based on thermal requirements, weight requirements, working medium requirements, or other requirements or needs, and the material used to form the heat pipes is not to be limited. Further, various heat pipes as employed herein can include interior structures including, but not limited to, ribs, lattice structures, fins, etc. that can be configured within the heat pipes that may be configured to provide structural support or integrity to the heat pipes or augment thermal transfer within the heat pipes. For example, in some embodiments, the heat pipes can be configured with rib structures, lattice structures, or other structures that are configured to connect inner and outer walls of the heat pipes.

Although described above with respect to the heat pipe being exposed to cool fuel within the fuel conduit, those of skill in the art will appreciate that alternative cooling means can be used without departing from the scope of the present disclosure. Those of skill in the art will appreciate that the heat pipes can be exposed to any cooling source. For example, in some embodiments, the condensation section of the heat pipe can be exposed to cooling gases (e.g., cooling air, swirler air, water, etc.) that is used for cooling within a gas turbine engine. Further, other cooling sources can be used as will be appreciated by those of skill in the art. Advantageously, embodiments provided herein are configured to take advantage of already existing relatively cool mediums to enable condensation of a working fluid within a heat pipe that is in thermal contact or communication with a nozzle of a fuel injector.

Advantageously, various heat pipes as provided herein can be installed onto existing fuel nozzles or can be formed in or with a nozzle during manufacturing of the nozzle. For example, a heat pipe can be wrapped around the exterior of the nozzle (e.g., FIGS. 3A-3B) and thus be applied to existing configurations. Alternatively, a heat pipe can be embedded within or manufactured with the formation of the fuel injector (nozzle, fuel conduit, etc.). In some embodiments, the fuel injector can be partially or entirely additively manufactured such that the heat pipe is integrally formed within and part of the structure of the fuel injector.

Advantageously, embodiments described herein provide a cooled fuel injector nozzle such that coking can be minimized or prevented. Further, advantageously, heat pipe cooling as provided herein may substantially isothermalize the nozzle tip portion of a fuel injector and thus minimize hot spots. Moreover, advantageously, heat dissipated by the heat pipe can be directed toward relatively cool fuel within a fuel conduit and thus pre-heat the fuel for combustion. Further, advantageously, by selecting the working medium or heat pipe configuration, the tip temperature of the nozzle can be controlled in a narrow band to prevent coke forming.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the spirit and scope of the present disclosure. Additionally, while various embodiments of the present disclosure have been described, it is to be understood that aspects of the present disclosure may include only some of the described embodiments.

For example, although shown with a single heat pipe (e.g., FIGS. 2-3), those of skill in the art will appreciate that fuel injectors can be configured with multiple heat pipes, as described herein, such that a desired heating/cooling profile can be achieved at the nozzle of the fuel injectors. Further, various configurations can take advantage of both liquid (e.g., fuel, water) and gas (e.g., cooling air) cooling for the heat pipes, as desired. Moreover, although shown with specific heat pipe configurations with specific fuel injector configurations, those of skill in the art will appreciate that such configurations are not to be limiting. For example, an axially staged combustor can include a heat pipe configuration(s) similar to that show in FIG. 4.

Further, those of skill in the art will appreciate that the heat pipes shown and described herein can be installed in various types of combustors or components thereof. For example, in some embodiments, heat pipes of the present disclosure can be installed into or formed with fuel injectors of radially staged combustors or within fuel injectors of can combustors. Additionally, although show with respect to fuel injectors, those of skill in the art will appreciate that heat pipes of the present disclosure can be installed with, on, or in various other components of combustors or combustion chambers. For example, in some embodiments, heat pipes can be configured within combustion chamber liners, bulk heads, heat shields, swirlers, hoods, support shells, etc. Thus, the present disclosure is not intended to be limited to only fuel injectors.

Moreover, although shown and described with respect to an aircraft engine, those of skill in the art will appreciate that embodiments provided herein can be employed within land-based or sea-based gas turbine engines and/or so industrial gas turbines (IGT). Furthermore, combustors as provided herein can be annular combustors, can combustors, or other types of combustors as known in the art. Further, in some embodiments, such as in industrial gas turbines, as known, water may be injected into the combustion chamber and used for emission control. Such water and/or associated water supply can be used as a cooling source for the heat pipes as described herein.

Accordingly, the present disclosure is not to be seen as limited by the foregoing description, but is only limited by the scope of the appended claims.

What is claimed is:

1. A fuel injector for a gas turbine engine comprising:
   a nozzle configured to dispense fuel into a combustor of the gas turbine engine;
   a fuel conduit fluidly connecting a fuel source to the nozzle to supply fuel therethrough; and
   a heat pipe having a vaporization section and a condensation section, wherein the vaporization section is in thermal communication with the nozzle and the condensation section is in thermal communication with the fuel source, wherein the condensation section extends into the fuel source.

2. The fuel injector of claim 1, wherein the vaporization section of the heat pipe is wrapped around the nozzle.

3. The fuel injector of claim 1, wherein at least a portion of the heat pipe passes through a wall of a portion of the fuel injector.

4. The fuel injector of claim 1, wherein the heat pipe is integrally formed with at least one of the nozzle and the fuel conduit.

5. The fuel injector of claim 1, wherein the heat pipe is one of a thermosiphon, a capillary-driven heat pipe, an annular heat pipe, a vapor chamber, a gas-loaded heat pipe, a loop heat pipe, a capillary pumped loop heat pipe, a pulsating heat pipe, a micro heat pipe, or a miniature heat pipe.

6. The fuel injector of claim 1, wherein the nozzle and fuel conduit are components of an axially staged fuel injector.

7. The fuel injector of claim 1, wherein the nozzle and fuel conduit are components of a radially staged fuel injector.

8. The fuel injector of claim 1, wherein at least a portion of the fuel injector is additively manufactured and the heat pipe is formed by the additive manufacturing process within the fuel injector.

9. The fuel injector of claim 1, wherein the heat pipe is a pulsating heat pipe.

10. A gas turbine engine comprising:
    a combustor section having a plurality of components; and
    a heat pipe configured with a first fuel injector of the combustor section, the heat pipe having a vaporization section and a condensation section, wherein the vaporization section of the heat pipe is in thermal communication with the first fuel injector and the condensation section is in thermal communication with a cooling source,
    wherein the first fuel injector includes a nozzle and a fuel conduit fluidly connecting a first fuel source to the nozzle to supply fuel therethrough, wherein the vaporization section is in thermal communication with the nozzle and the condensation section is in thermal communication with the cooling source, and wherein with the cooling source is the first fuel source, wherein the condensation section extends into the fuel source.

11. The gas turbine engine of claim 10, wherein the vaporization section of the heat pipe is wrapped around the nozzle.

12. The gas turbine engine of claim 10, wherein the nozzle and fuel conduit are components of an axially staged fuel injector.

13. The gas turbine engine of claim 10, further comprising a second fuel injector that is a radially staged fuel injector of the gas turbine engine.

14. The gas turbine engine of claim 13, wherein the second fuel injector includes a second nozzle configured to dispense fuel into the combustor and a second fuel conduit fluidly connecting a second fuel source to the second nozzle, the gas turbine engine further comprising a second heat pipe having a vaporization section and a condensation section, wherein the vaporization section of the second heat pipe is in thermal communication with the nozzle of the second fuel injector and the condensation section of the second heat pipe is in thermal communication with a second cooling source.

15. The gas turbine engine of claim 14, wherein at least one of the first and second fuel sources are the same fuel source and the first and second cooling sources are the same cooling source.

16. The gas turbine engine of claim 10, wherein the heat pipe is integrally formed with the first fuel injector.

17. The gas turbine engine of claim 10, wherein the heat pipe is one of a thermosiphon, a capillary-driven heat pipe, an annular heat pipe, a vapor chamber, a gas-loaded heat pipe, a loop heat pipe, a capillary pumped loop heat pipe, a pulsating heat pipe, a micro heat pipe, or a miniature heat pipe.

18. The gas turbine engine of claim 10, wherein the first fuel injector is additively manufactured and the heat pipe is formed by the additive manufacturing process within the first fuel injector.

\* \* \* \* \*